Patented Sept. 4, 1934

1,972,340

UNITED STATES PATENT OFFICE 1,972,340

PROCESS FOR THE PREPARATION OF LACTONES

Edward L. Helwig and George M. Wiedeman, Bristol, Pa., assignors to Röhm & Haas Company, Philadelphia, Pa.

No Drawing. Application April 13, 1932, Serial No. 605,109

13 Claims. (Cl. 260—123)

This invention relates to a process for preparing lactones, particularly gluconic acid lactones. It has for its object the preparation of the lactones by a cheap and convenient method hitherto unknown in the art, and the use of solvents which have been found to be highly efficient in the process. Further objects will appear hereafter.

The literature discloses that lactones have been prepared by the action of mineral acid dehydrating agents upon hydroxy-acids. (Houben-Weyl, Die Methoden der Organischen Chemie, 1923, pp. 479 and 484.) Aliphatic alcohols of more than two carbon atoms such as butyl have been used as dehydrating agents in the preparation of esters of various kinds heretofore, and a recent patent (U. S. 1,830,618) indicates that they are suitable for use in the preparation of gluconic acid lactones.

In the preparation of lactones, and particularly gluconic acid lactone, we have found that glycol ethers are far superior to other solvents. In order to fill the requirements of this preparation, a solvent must meet a rather exacting set of conditions. It should be an excellent solvent for the hydroxy-acid and its lactone at elevated temperatures and a poor solvent for the lactone at low temperatures. It should have a boiling point above that of water so that water of solution and water of constitution can be removed by evaporation, while the bulk of the solvent remains behind. It should be miscible with water and with hydroxy-acid solutions. It should not form an ester with the hydroxy-acids. It should not be viscous so that it will not slow down the filtration. We have found that the glycol ethers, and particularly ethylene glycol-mono-ethyl ether, fill these conditions perfectly. Butyl alcohol and some of the higher aliphatic alcohols fulfill some of these conditions, but those members of the series which have a sufficiently high boiling point are not sufficiently soluble in water, and they are not good enough solvents for the hydroxy-acids and lactones at elevated temperatures. The glycols, on the other hand, are sufficiently soluble in water and easily dissolve both the hydroxy-acids and lactones at elevated temperatures, but they dissolve too much lactone at low temperatures and are too viscous. Consequently, it is not easy to crystallize the lactones from these solvents. The glycol ethers have the advantages of both of these classes of solvents without the disadvantages.

In the commercial production of these lactones, the corrosive action of the hydroxy-acids upon metallic equipment presents a very serious difficulty. Hot aqueous gluconic acid, for instance, attacks the common metals, the commercially available alloys, and even enameled ware. Therefore, it is very difficult to evaporate an aqueous gluconic acid solution on a commercial scale and this is necessary as the acid is generated in dilute solution. We have found that the corrosive action of such a solution is very much decreased by the presence of water soluble glycol ethers. By our process, the hdroxy-acid is generated in the presence of the glycol ether and so its corrosive action on the apparatus is avoided. This is not the case if the gluconic acid is generated in the presence of butyl alcohol, as this alcohol is not sufficiently soluble in water to afford the same protective action.

The most readily available commercial source of gluconic acid is calcium gluconate, obtained either by fermentation or by electrolytic oxidation of glucose. The free acid can be most conveniently and cheaply prepared from its calcium salt by treatment with sulphuric acid.

As to a source of the gluconic acid, any gluconate could be used which, on reacting with sulphuric acid, would give a salt insoluble in the glycol ether. Sodium gluconate or barium gluconate would be satisfactory for this purpose. The calcium salt, however, is the prime product by either the fermentation process or the electrolytic oxidation process so that it would be the natural source to use for commercial production.

This yields a solution, however, which is saturated with calcium sulphate and it is necessary to remove this impurity before crystallizing the lactone. Otherwise, the product would be contaminated. By our process it is possible to do this as the lactone is still freely soluble in the hot glycol ether even after the water has been removed, while calcium sulphate is very insoluble. The lactone is not nearly so soluble in butyl alcohol, therefore it is difficult to remove the calcium sulphate in the same manner with this solvent. If sufficient butyl alcohol were present to dissolve all the lactone in hot solution, it would dissolve too much in the cold and the yield on crystallizing would be very poor. Therefore, it is not practical to filter out the impurities just before crystallizing if butyl alcohol is used as the solvent, and this is the most desirable point for filtering the solution as it removes, with the calcium sulphate, any accidental dirt which has been introduced from the equipment.

It is not necessary, in our process, to remove all the water before crystallizing out the lactone. It is preferable to remove the bulk of it, but not necessary. Complete dehydration need not be sought in our process.

The following example is given as a specific illustration of our process: 250 gms. of calcium gluconate (12.3% CaO), 450 cc. of water and 150 cc. of ethylene-glycol-mono-ethyl-ether (in subsequent runs, the distillate described below was used in place of the mixture of ethylene-glycol-mono-ethyl ether and water) were placed in a one liter, three-necked flask, fitted with an efficient stirrer, thermometer, and dropping funnel, and heated to 60° C., while 59.5 gms. (5% excess) of 95% sulphuric acid were added, dropwise, during 15 min., the temperature was maintained at 60° C., and stirring continued 2 hours. The mixture was filtered, the calcium sulphate cake being washed with 100 cc. ethylene-glycol-mono-ethyl ether, and then was pressed as dry as possible. The filtrate was placed in a two liter flask and 15 gms. of calcium gluconate (5% excess) were added. After boiling 15 min., a small sample was withdrawn, filtered, and the filtrate found to be free of sulphate ions. Then 600 cc. (in subsequent runs, the mother liquor from the previous batch was used in place of the 600 cc. of ethylene-glycol-mono-ethyl ether) of ethylene-glycol-mono-ethyl ether were added. The mixture was distilled until the temperature of distillation reached 110° C. This distillate is used to start a subsequent batch. The mixture in the distillation flask was filtered hot and residue washed with 50 cc. of ethylene-glycol-mono-ethyl ether and the filtrate set aside to cool and crystallize. The gluconic acid lactone crystallized out in large crystals, was removed by filtration and dried.

This process was repeated six times, in each case the mother liquor and distillate being used in the subsequent run. At the end of this series, the mother liquor was evaporated to one-quarter its original volume and a second crop of lactone crystals obtained.

The following materials were used:
1590 gms. of calcium gluconate
380 gms. of sulphuric acid
1600 gms. of ethylene-glycol-mono-ethyl ether.

The following materials were recovered:
1160 gms. of gluconic acid lactone
1360 gms. of ethylene-glycol-mono-ethyl ether.

It is apparent of course that instead of starting out with calcium gluconate in order to obtain the gluconic acid the process may be started at the distillation step with gluconic acid prepared in any manner whatever. In place of the ethylene-glycol-mono-ethyl ether mentioned above other glycol ethers such as ethylene-glycol-mono-butyl ether and di-ethylene-glycol-mono-ethyl ether have been used in the process with good results.

Anyone versed in the art will recognize that wide variation may be made in temperatures, condition of operation and the other factors described in the specific example without departing from the scope of this invention. It is to be understood that we are in no wise limited except as indicated in the following claims.

What we claim is:

1. The step in the process of preparing gluconic acid lactone which comprises heating a solution of gluconic acid with a glycol ether.

2. A process for the preparation of gluconic acid lactone comprising heating an aqueous solution of gluconic acid with a glycol ether, distilling off the water with some of the glycol ether, and crystallizing the lactone from the balance of the glycol ether.

3. The step in the process of preparing gluconic acid lactone which comprises heating a solution of gluconic acid with ethylene-glycol-mono-ethyl ether.

4. A process for the preparation of gluconic acid lactone comprising heating an aqueous solution of gluconic acid with ethylene-glycol-mono-ethyl ether, distilling off the water with some of the ethylene-glycol-mono-ethyl ether, and crystallizing the lactone from the balance of the ethylene-glycol-mono-ethyl ether.

5. The process of preparing gluconic acid lactone which comprises treating calcium gluconate with sulphuric acid, removing the calcium sulphate and distilling off water with a glycol ether.

6. A process as described in claim 5 in which ethylene-glycol-mono-ethyl ether is the glycol ether employed.

7. A process for the preparation of gluconic acid lactone comprising treating a suspension of calcium gluconate in aqueous glycol ether solution with sulphuric acid, removing the bulk of the calcium sulphate, then adding a glycol ether solution of lactone, and removing the water with some of the glycol ether by distillation, then filtering out the balance of the calcium sulphate from the hot glycol ether solution of the lactone, allowing said lactone to crystallize out on cooling, and removing the lactone crystals from the mother liquor, suspending more calcium gluconate in the aqueous glycol ether distillate and repeating the above steps, re-using the mother liquor and distillate, filtering, and crystallizing to produce more lactone.

8. A process for the preparation of gluconic acid lactone comprising treating a suspension of calcium gluconate in aqueous ethylene-glycol-mono-ethyl ether solution with sulphuric acid, removing the bulk of the calcium sulphate, then adding an ethylene-glycol-mono-ethyl solution of lactone, and removing the water with some of the ethylene-glycol-mono-ethyl ether by distillation, then filtering out the balance of the calcium sulphate from the hot ethylene-glycol-mono-ethyl ether solution of the lactone, allowing said lactone to crystallize out on cooling, and removing the lactone crystals from the mother liquor, suspending more calcium gluconate in the aqueous ethylene-glycol-mono-ethyl ether distillate and repeating the above steps, re-using the mother liquor and distillate, filtering, and crystallizing to produce more lactone.

9. Process of preparing gluconic acid lactone which comprises treating with sulphuric acid a gluconate which will give a salt insoluble in glycol ether, removing the sulphate thus formed and distilling off water with a glycol ether.

10. Process of preparing gluconic acid lactone which comprises treating an alkali-forming metal gluconate with sulphuric acid, removing the sulphate thus formed and distilling off water with a glycol ether.

11. A process as described in claim 10 in which ethylene-glycol-mono-ethyl ether is the glycol ether employed.

12. A process as described in claim 2 in which the distillation is stopped before all the water is distilled off.

13. A process as described in claim 4 in which the distillation is stopped before all the water is distilled off.

EDWARD L. HELWIG.
GEORGE M. WIEDEMAN.